(12) United States Patent  (10) Patent No.: US 9,334,575 B2
Zelenay et al.  (45) Date of Patent: May 10, 2016

(54) CATALYTIC OXIDATION OF DIMETHYL ETHER

(71) Applicant: Los Alamos National Security, LLC, Los Alamos, NM (US)

(72) Inventors: Piotr Zelenay, Los Alamos, NM (US); Gang Wu, Los Alamos, NM (US); Christina M. Johnston, Los Alamos, NM (US); Qing Li, Providence, RI (US)

(73) Assignee: Los Alamos National Security, LLC, Los Alamos, NM (US)

( * ) Notice: Subject to any disclaimer, the term of this patent is extended or adjusted under 35 U.S.C. 154(b) by 420 days.

(21) Appl. No.: 13/840,831

(22) Filed: Mar. 15, 2013

(65) Prior Publication Data

US 2013/0292260 A1  Nov. 7, 2013

Related U.S. Application Data

(60) Provisional application No. 61/642,324, filed on May 3, 2012.

(51) Int. Cl.
| | |
|---|---|
| *B01J 21/18* | (2006.01) |
| *B01J 23/40* | (2006.01) |
| *B01J 23/42* | (2006.01) |
| *B01J 23/46* | (2006.01) |
| *C22C 5/00* | (2006.01) |
| *C22C 5/04* | (2006.01) |
| *C25B 3/02* | (2006.01) |
| *B01J 35/00* | (2006.01) |

(52) U.S. Cl.
CPC ............ *C25B 3/02* (2013.01); *B01J 23/462* (2013.01); *B01J 35/0033* (2013.01)

(58) Field of Classification Search
CPC ............ B01J 21/18; B01J 23/40; B01J 23/42; B01J 23/46; C22C 5/00; C22C 5/04
USPC ........................ 502/185; 420/462, 465, 466
See application file for complete search history.

(56) References Cited

U.S. PATENT DOCUMENTS

| | | | | |
|---|---|---|---|---|
| 3,055,840 | A * | 9/1962 | Koch, Jr. | 502/174 |
| 4,460,660 | A * | 7/1984 | Kujas | 429/505 |
| 5,208,207 | A * | 5/1993 | Stonehart et al. | 502/339 |
| 5,696,293 | A * | 12/1997 | Phillips et al. | 564/480 |
| 6,007,934 | A * | 12/1999 | Auer et al. | 429/480 |
| 6,498,121 | B1 * | 12/2002 | Gorer | 502/325 |
| 6,670,301 | B2 * | 12/2003 | Adzic et al. | 502/185 |
| 7,132,385 | B2 * | 11/2006 | Pak | 502/185 |
| 7,691,780 | B2 * | 4/2010 | Adzic et al. | 502/339 |
| 2010/0048388 | A1 * | 2/2010 | Konishi | 502/101 |

(Continued)

OTHER PUBLICATIONS

Kerangueven et al., "Mechanism of di(methyl)ether (DME) electrooxidation at platinum electrodes in acid medium," Journal of Applied Electrochemistry 36:441-448, 2006.

(Continued)

*Primary Examiner* — Patricia L Hailey
(74) *Attorney, Agent, or Firm* — Lewis Roca Rothgerber Christie LLP

(57) ABSTRACT

A composition for oxidizing dimethyl ether includes an alloy supported on carbon, the alloy being of platinum, ruthenium, and palladium. A process for oxidizing dimethyl ether involves exposing dimethyl ether to a carbon-supported alloy of platinum, ruthenium, and palladium under conditions sufficient to electrochemically oxidize the dimethyl ether.

3 Claims, 1 Drawing Sheet

(56) References Cited

U.S. PATENT DOCUMENTS

| | | | | |
|---|---|---|---|---|
| 2010/0086831 | A1* | 4/2010 | Fisher et al. | 429/44 |
| 2012/0310023 | A1* | 12/2012 | Huang et al. | 585/241 |
| 2015/0030967 | A1* | 1/2015 | Kojima et al. | 429/525 |

OTHER PUBLICATIONS

Liu et al., "Electrochemical and ATR-FTIR study of dimethyl ether and methanol electro-oxidation on sputtered Pt electrode," Electrochimica Acta 52:5781-8788, 2007 (published online Mar. 1, 2007).

Liu et al., "Electro-oxidation of dimethyl ether on Pt/C and PtMe/C catalysts in sulfuric acid," Electrochimica Acta 51:6503-6509, 2006 (published online Jun. 12, 2006).

Li et al., "Anode Catalysts for the Direct Dimethyl Ether Fuel Cell," ECS Transactions 41(1):1969-1977, 2011.

Muller et al., "Electro-oxidation of Dimethyl Ether in a Polymer-Electrolyte-Membrane Fuel Cell," Journal of the Electrochemical Society 147(11):4058-4060, 2000.

Shao et al., "In situ ATR-SEIRAS study of electrooxidation of dimethyl ether on a Pt electrode in acid solutions," Electrochemistry Communications 7:459-465, 2005 (published online Mar. 17, 2005).

Yudanov et al., "How the C-O Bond Breaks during Methanol Decomposition of Nanocrystallites of Palladium Catalysts," Journal of the American Chemical Society 130:9342-9352, 2008 (published online Jun. 25, 2008).

Zhang et al., "Electrochemical and infrared study of electro-oxidation of dimethyl ether (DME) on platinum polycrystalline electrode in acid solutions," Electrochimica Acta 53:6093-6103, 2008 (published online Feb. 21, 2008).

* cited by examiner

CATALYTIC OXIDATION OF DIMETHYL ETHER

RELATED APPLICATIONS

This application claims the benefit of U.S. Provisional Application No. 61/642,324 entitled "A Ternary Catalyst for Dimethyl Ether Oxidation," filed May 3, 2012, incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to oxidation and more particularly to a composition supported on carbon, the composition comprising platinum, ruthenium, and palladium, and to a process employing the composition for the catalytic electrooxidation of dimethyl ether.

BACKGROUND OF THE INVENTION

Dimethyl ether (DME) has been studied for a decade as a fuel for portable fuel cell power sources. Chemical intermediates form during the oxidation of DME on a platinum catalyst. These intermediates have been identified using in situ infrared (IR) spectroscopy [1, 2, 3, 4]. Based upon a knowledge of these intermediates, a possible mechanism for DME oxidation on elemental platinum (Pt) has been proposed [5]. This mechanism is summarized in the five following steps below:

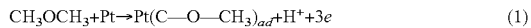

$$CH_3OCH_3 + Pt \rightarrow Pt(C-O-CH_3)_{ad} + H^+ + 3e \qquad (1)$$

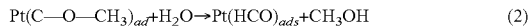

$$Pt(C-O-CH_3)_{ad} + H_2O \rightarrow Pt(HCO)_{ads} + CH_3OH \qquad (2)$$

$$Pt(HCO)_{ad} \rightarrow Pt(CO)_{ad} + H^+ + e \qquad (3)$$

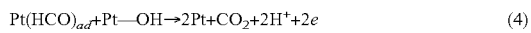

$$Pt(HCO)_{ad} + Pt-OH \rightarrow 2Pt + CO_2 + 2H^+ + 2e \qquad (4)$$

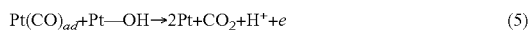

$$Pt(CO)_{ad} + Pt-OH \rightarrow 2Pt + CO_2 + H^+ + e \qquad (5)$$

Based on an understanding of the above mechanism, bimetallic platinum-based alloys of platinum and ruthenium were found to be effective for oxidation of DME [6]. These bimetallic alloys provide an advantage of being capable of mitigating the poisonous effect of adsorbed CO (i.e. $CO_{ad}$) on elemental platinum (Pt).

In a recent study, however, the electrooxidation of DME using the above bimetallic alloys of platinum and ruthenium as electrocatalysts was found to be kinetically handicapped compared to the electrooxidation of methanol using these same bimetallic alloys. If the proposed mechanism shown above is examined closely, step (1) involves the initial adsorption of DME on the catalyst surface, and step (2) involves oxidation of the adsorbed DME by an adsorbed and activated water molecule; step (2) involves splitting a C—O bond. The subsequent steps (3) to (5) are the similar to those that occur during the oxidation of methanol. Without wishing to be bound by any particular explanation, it may be that an activation barrier for the C—O bond cleavage may be responsible for the slower kinetics of DME oxidation compared to the oxidation of methanol.

Transition metals such as palladium (Pd) are known to aid in the C—O bond splitting of ethers [8].

An object of this invention is a composition useful for the catalytic oxidation of dimethyl ether.

Another object of this invention is a process for the catalytic oxidation of dimethyl ether.

SUMMARY OF THE INVENTION

In accordance with the purposes of the present invention, as embodied and broadly described herein, an aspect of the present invention includes a catalyst for oxidizing dimethyl ether, said catalyst comprising $Pt_{60}Ru_{15}Pd_{25}$ supported on carbon.

Another aspect of the present invention relates to a process for oxidizing dimethyl ether. The process involves exposing dimethyl ether to a catalyst under conditions suitable for the electrochemical oxidation of dimethyl ether, wherein the catalyst comprises platinum, ruthenium, and palladium on a carbon support. An embodiment catalyst comprises $Pt_{60}Ru_{15}Pd_{25}$ on a carbon support.

Another aspect of the present invention relates to a process for cleaving a C—O bond. The process involves exposing a compound having a C—O bond to a catalyst under conditions sufficient to cleave the C—O bond, the catalyst comprising a carbon supported alloy of platinum, ruthenium, and palladium.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The invention relates to a composition and process for catalytic oxidation of dimethyl ether. Embodiment compositions include a support material and a plurality of metals on the support material.

In an embodiment of the composition for catalytic oxidation of dimethyl ether, the support material is carbon.

In an embodiment of the composition for catalytic oxidation of dimethyl ether, the plurality of metals is a combination of platinum, ruthenium, and palladium. The combination is an alloy of these metals.

In an embodiment for the catalytic oxidation of dimethyl ether, the composition is $Pt_{60}Ru_{15}Pd_{26}$ supported on carbon.

The invention was demonstrated by performing oxidations of dimethyl ether using an embodiment composition. Benefits of the embodiment composition were demonstrated by experimental results comparing electrooxidation reactions using the embodiment composition with results using a commercially available catalyst that is considered to be a state-of-the-art catalyst for the oxidation of methanol.

The embodiment composition $Pt_{60}Ru_{15}Pd_{26}$ supported on carbon was synthesized by the polyol method. A variety of precursor materials including $H_2PtCl_6 \cdot 6H_2O$, $RuCl_3$ and $PdCl_2$ were used for the synthesis. In an embodiment, Vulcan XC-72 carbon black (CABOT CORPORATION) was used as the catalyst support. In an embodiment synthesis, 0.69 grams (g) $H_2PtCl_6 \cdot 6H_2O$, 0.321 g $RuCl_3$ and 0.053 g $PdCl_2$ were added to ethylene glycol solvent to form a brown solution. The brown solution had a metal concentration of about 2 mg metal per milliliter of solvent. The pH of the brown solution was adjusted by adding sodium hydroxide in deionized water until the pH was above a pH of 13. After adjusting the pH, the resulting solution was heated to 170° C. and kept at this temperature for 3 hours. The result was a brown-black sol. At this time, 0.1 g XC-72 carbon black was added to the brown-black sol and stirred for half an hour. The resulting mixture was cooled to room temperature and dilute hydrochloric acid was added to the mixture in order to adjust the pH to a value below 3. The mixture was stirred for 12 hours to settle the nanoparticles of the mixture, which were then filtered and dried at 80° C. for 8 hours. The product after this drying was an embodiment composition of $Pt_{60}Ru_{15}Pd_{25}$ supported on carbon.

Figure 1:
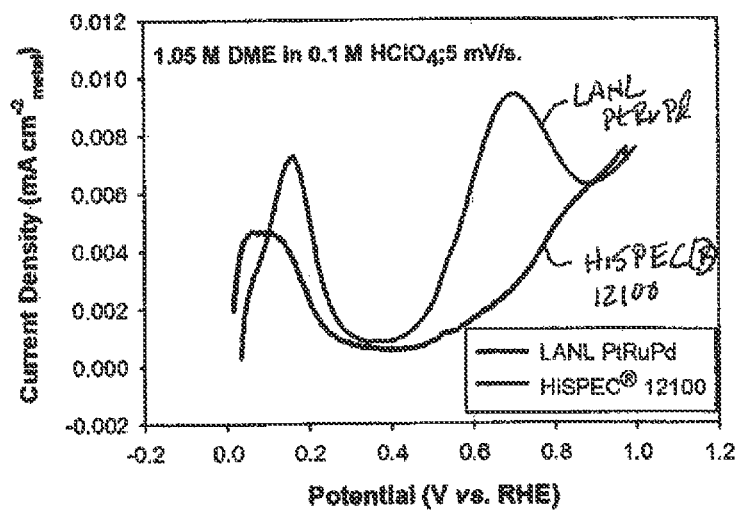
FIG. 1 provides linear sweep voltammograms of current density in units of milliamperes per square centimeter (mA/cm$^2$) versus potential in units of volts (V) versus RHE that compare the behavior of a commercially available catalyst with an embodiment composition of $Pt_{60}Ru_{15}Pd_{26}$ supported on carbon (C).

FIG. 1 provides linear sweep voltammograms of current density in units of milliamperes per square centimeter (mA/$cm^2$) versus potential in units of volts (V) versus RHE that compare the behavior of embodiment composition of $Pt_{60}Ru_{15}Pd_{26}$ supported on carbon (C) with the behavior of a state-of-the-art catalyst. FIG. 1 summarizes half-cell measurements that indicate that the specific activity of DME electrooxidation measured with the embodiment ternary composition $Pt_{60}Ru_{15}Pd_{25}$ supported on carbon (24% metal loading), whose synthesis is described above, is higher than that of the state-of-the-art catalyst for methanol oxidation, which is prior art catalyst $Pt_{50}Ru_{50}$ supported on carbon (HiSPEC® 12100, 75% metal loading). As FIG. 1 shows, the onset potential of DME oxidation is by about 50 mV lower with the embodiment catalyst than with HiSPEC® 12100 (0.38 V vs. 0.43 V). Furthermore, the peak current of DME oxidation measured on the embodiment catalyst is larger than that on HiSPEC® 12100 for the same catalyst loading.

Figure 2:
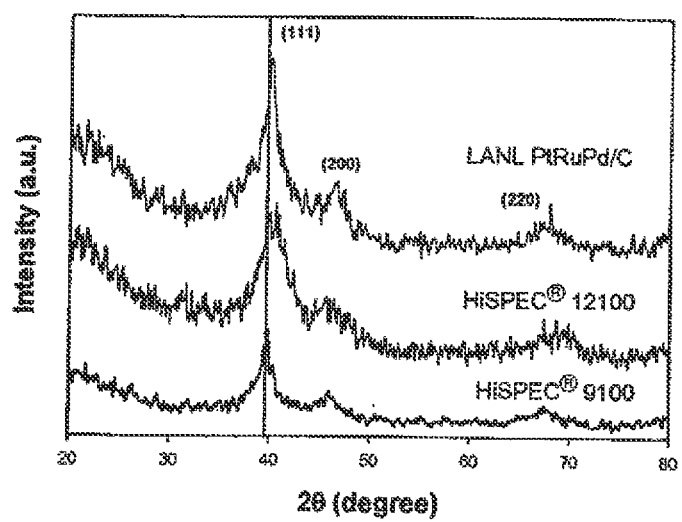
FIG. 2 provides a comparison of X-ray diffraction (XRD) patterns of two commercially available catalysts with the XRD pattern of an embodiment composition of $Pt_{60}Ru_{15}Pd_{26}$ supported on carbon.

FIG. 2 provides a comparison of X-ray diffraction (XRD) patterns of two commercially available catalysts with the XRD pattern of an embodiment composition of $Pt_{60}Ru_{15}Pd_{26}$ supported on carbon. The X-Ray Diffraction (XRD) patterns of FIG. 2 confirm the alloy formation of the product embodiment composition $Pt_{60}Ru_{15}Pd_{25}$ on carbon, as indicated by the (111) peak shift relative to Pt.

In summary, experimental data suggest that carbon-supported ternary metal compositions of Pt, Ru, and Pd offer a performance advantage compared to carbon-supported binary metal compositions of Pt and Ru. Without wishing to be bound by any particular theory or explanation, the performance advantage for oxidation of dimethyl ether may be due to an activating property of Pd in the embodiment ternary alloy that facilitates C—O bond cleavage.

Although the present invention has been described with reference to specific details, it is not intended that such details should be regarded as limitations upon the scope of the invention, except as and to the extent that they are included in the accompanying claims.

REFERENCES

The following references are incorporated by reference herein.

[1] Shao et al., "In situ ATR-SEIRAS study of electrooxidation of dimethyl ether on a Pt electrode in acid solutions," Electrochem. Commun., May 2005, vol. 7, pp. 459-465.
[2] Kerangueven et al., "Mechanism of di(methyl)ether (DME) electrooxidation at platinum electrodes in acid medium," J. Appl. Electrochem., April 2006, vol. 3, pp. 441-448.
[3] Liu et al., "Electrochemical and ATR-FTIR study of dimethyl ether and methanol electro-oxidation on sputtered Pt electrode," Electrochim. Acta, May 2007, vol. 52, pp. 5781-5781.
[4] Zhang et al., "Electrochemical and infrared study of electro-oxidation of dimethyl ether (DME) on platinum polycrystalline electrode in acid solutions," Electrochim Acta, September 2008, vol. 53, p. 6093-6103.
[5] Müller et al., "Electro-oxidation of Dimethyl Ether in a Polymer-Electrolyte-Membrane Fuel Cell," J. Electrochem. Soc., 2000, vol. 147, pp. 4058-4060.
[6] Liu et al., Electrochim. Acta, Electro-oxidation of dimethyl ether on Pt/C and PtMe/C catalysts in sulfuric acid," September 2006, vol. 51, p. 6503-6509.
[7] Li et al., "Anode Catalysts for the Direct Dimethyl Ether Fuel Cell," ECS Transactions, October 2011, vol. 41, p. 1969-1977.
[8] Yudanov et al., "How the C—O Bond Breaks during Methanol Decomposition on Nanocrystallites of Palladium Catalysts," J. Am. Chem. Soc., Jun. 25, 2008, vol. 130, pp. 9342-9352.

What is claimed is:
1. A composition, consisting essentially of:
carbon; and
$Pt_{60}Ru_{15}Pd_{25}$ supported on the carbon, wherein the composition catalyzes an oxidation of dimethyl ether.
2. The composition of claim 1, wherein a metal loading value associated with the composition is between 22% and 26%.
3. The composition of claim 1, wherein a metal loading value associated with the composition is 24%.

* * * * *